Patented July 5, 1932

1,865,588

UNITED STATES PATENT OFFICE

ALBERT REIMANN, OF LUDWIGSHAFEN-ON-THE-RHINE, GERMANY

PROCESS FOR THE PRODUCTION OF A DI-SODIUM PHOSPHATE WITH TWO MOLECULES OF WATER OF CRYSTALLIZATION

No Drawing. Application filed January 19, 1929, Serial No. 333,747, and in Germany March 23, 1928.

The invention relates to an improved process of producing di-sodium phosphate poor in water of crystallization.

Of the neutral salts of ortho-phosphoric acid, di-sodium phosphates are known having 12, 7 and 2 molecules of water of crystallization. Of these the first mentioned is the only one which has acquired technical importance hitherto. It is used on a large scale for loading silk. According to its composition there is no less than 60% water of crystallization to 19.8% $P_2O_5$, i. e. to one part of active substance in each case three parts of water have to be conveyed at high transportation costs, which means an extremely large amount of ballast in the load. A somewhat better, but still unfavourable proportion of $P_2O_5$ to water, is obtained in the case of the salt with 7 molecules of water of crystallization. The completely anhydrous salt has not been adopted in the silk industry for certain other reasons.

The di-sodium phosphate having 2 molecules of water of crystallization is the only one having any prospect of being successful in this competition for the most favourable ratio between load and active mass, as compared with the other salts rich in water of crystallization, as in its case, with a content of 40% $P_2O_5$ and 20% water of crystallization, there are only 0.5 parts water of crystallization to one part active mass ($P_2O_5$). Up till now the preparation of this product has been very difficult and restricted merely to laboratory preparations, as the salt containing 12 molecules of water had always to be obtained first, and the latter then converted into the salt having 2 molecules of water either by renewed dissolving, evaporation and crystallizing out or by a suitable drying process.

Now I have found that this product can be produced in a simple manner in one operation without intermediate crystallization, and thus be prepared industrially on a large scale. In the present process this salt is crystallized from highly concentrated lyes above the conversion temperature—above 50° C.—, that is to say, for this purpose a previously concentrated and purified phosphoric acid, containing about 600–700 grs. $P_2O_5$ per litre, is neutralized with the calculated amount of soda or soda lye and the di-sodium phosphate, poor in water of crystallization is thus obtained above 50° C. from the saturated lye in the form of well-formed crystals. It is also possible however to proceed from a more dilute and pure di-sodium phosphate liquor, if the latter is evaporated under a diminished pressure until crystals precipitate. In both cases a pure sodium phosphate of the composition $Na_2HPO_4.2H_2O$ is obtained.

What I claim is:

1. A process for the production of a di-sodium phosphate having two molecules of water of crystallization which consists in directly crystallizing the di-sodium phosphate from a pure di-sodium phosphate solution above 50° C.

2. In the process of claim 1 the step which consists in crystallizing the di-sodium phosphate under reduced pressure.

In testimony whereof I affix my signature.

DR. ALBERT REIMANN.